United States Patent [19]

Bruggert et al.

[11] 4,099,299
[45] Jul. 11, 1978

[54] ELASTICALLY RESILIENT FASTENING CLIP

[76] Inventors: Paul Bruggert, 19, rue Thierenbach, 68500 Jungholtz; Georges Schuller, 26 rue, Kreuzberger, 68500 Guebwiller, both of France

[21] Appl. No.: 739,974

[22] Filed: Nov. 8, 1976

[30] Foreign Application Priority Data

Nov. 10, 1975 [CH] Switzerland ............... 14540/75

[51] Int. Cl.² .................. A44B 21/00; A01G 17/10
[52] U.S. Cl. .................. 24/73 PS; 24/261 R; 47/46
[58] Field of Search .......... 24/131 R, 261 R, 261 GC, 24/261 AC, 261 DS, 261 WC, 261 PT, 261 LT, 261 A, 261 B, 261 F, 73 HL, 73 AS, 73 C, 73 CC, 73 CP, 73 HH, 73 HR, 73 PS, 73 SH, 139; 47/46, 44, 47

[56] References Cited

U.S. PATENT DOCUMENTS

| 2,527,713 | 10/1950 | Dunn ................ 24/261 B |
| 3,800,365 | 4/1974 | Bruggert ............ 24/73 HL |

FOREIGN PATENT DOCUMENTS 465,921   6/1950   Canada ............... 24/73 HH

*Primary Examiner*—Kenneth J. Dorner
*Attorney, Agent, or Firm*—Heinrich W. Herzfeld; Gilbert L. Wells

[57] ABSTRACT

An elastically resilient fastening clip is described which serves in particular for the fastening of trained fruit trees, vines, or the like to horizontally extending training wires. The clip comprises a slit loop the slit of which is widenable outwardly for introduction of a twig or the like part of the afore-mentioned plant and, after passing the plant part therethrough, closes again under the clamping effect of the loop of the fastening clip exercised at both sides of the slit. The clip further comprises hook parts bent at angles away from the slit in the loop; and, when the clip is fastened to the training wire, a contact zone of the loop opposite the slit is destined to lie essentially along one side of the training wire, and the slit and the adjacent hook parts are destined to lie on the other side thereof. A plant part introduced into the loop is pressed resiliently against the training wire, while, at the same time, the clamping tension caused by the insertion of the plant part prevents a lateral displacement of the clip along the training wire. The loop is provided with a hooklike projection or nose in the contact zone by means of which nose the contact zone can be hooked on to the training wire. The loop further has two crimped intermediate leg zones between the ends of the contact zone and the slit, and has generally the shape of a flat isosceles triangle with rounded angles, the slit being situated in the vertex of the triangle, while the base of the triangle forms the aforesaid contact zone, and the wire-engaging nose is in the middle of the same.

7 Claims, 5 Drawing Figures

U.S. Patent  July 11, 1978  Sheet 1 of 3  4,099,299

ELASTICALLY RESILIENT FASTENING CLIP

BACKGROUND OF THE INVENTION

This invention relates to an elastically resilient fastening clip, in particular for the fastening of trained fruit trees, vines, or the like to horizontally extending training wires, which clip comprises a slit loop the slit of which is widenable outwardly for introduction of a sapling, a twig, a shoot, or the like part of the aforementioned plant and, after passing the plant part therethrough, closes again under the clamping effect of the loop of the fastening clip exercised at both sides of the slit; and which clip further comprises hook parts bent at angles away from the slit in the loop; and wherein, when the clip is fastened to the training wire, the reach or a contact zone of the loop opposite the slit is destined to lie essentially along one side of the training wire, and the slit and the adjacent hook part are destined to lie on the other side thereof, and, wherein a plant introduced into the loop is pressed resiliently against the training wire, while, at the same time, the clamping tension caused by the insertion of the plant part prevents a lateral displacement of the clip along the training wire.

The end portions of the loop, instead of crossing each other, are bent apart to provide the said slit in the loop and end in the aforesaid hook parts.

A fastening clip of this type is described in U.S. Pat. No. 3,800,365 issued on Apr. 2, 1974.

However, a plant part to be fastened on a wire by means of this known fastening clip can only be easily inserted, when it is pressed through the slit of the known clip practically at a right angle relative to the loop plane.

This is satisfactory when saplings to be trained are fastened in accordance with an older method still practised especially in vineculture which requires that the tip of an individual sapling is bent downwardly over an upper training wire and fastened to a lower training wire running parallel with the upper wire. In this case, the free end of the sapling forms the required right angle with the loop plane for easy insertion in the known clip.

This is not the case when the free end of a sapling is fastened according to a newer method, without use of an upper wire directly to a training wire running approximately at the level of the upper end of the root stock of the plant and forms an acute angle, of a few to 30° with the loop plane of the known clip and insertion is then difficult.

Moreover, when the training wire is not properly tensioned, the hooks on the legs of the known clip tend to unhook easily.

OBJECT AND SUMMARY OF THE INVENTION

It is, therefore, an object of the present invention to provide an elastically resilient fastening clip into which a sapling or a corresponding plant part can be easily introduced when it is bent to form, with the training wire, an acute angle, especially a very small angle of a few degrees only, while affording an equally good or better fastening effect and prevention of lateral displacement along the training wire, than is obtained with the aforesaid known clip.

This object is attained by an elastically resilient fastening clip of the type initially described, wherein the loop is provided with a hook-like projection or nose in a contact zone or reach lying opposite the slit, by means of which nose this contact zone of the loop can be hooked on to the training wire from that side on which the bent-away hook parts are lying, while both of the crimped intermediate zones of the loop between the ends of the contact zone and the slit come to lie on the last-mentioned side of the training wire opposite that of the contact zone, and the contact zone of the loop containing the nose preferably lies approximately parallel to the training wire, due to the fact that the loop has an elongated, preferably compressed or flattened shape in the plane in which the loop extends.

Preferably, the slit loop has the shape of a flat isosceles triangle with rounded angles and the slit is situated in the vertex of the triangle. Moreover, the base of the triangle forming the aforesaid contact zone extends essentially parallel to the inserted training wire and has the wire-engaging nose in the middle of the base. The angles between the base and the "isosceles" sides or "legs" of the triangle abut against the training wire on a side thereof that is opposite the side on which the nose reaches downwardly over the training wire.

The wire-engaging nose can be easily formed by bending a short stretch of the loop, in the reach opposite the slit, in the form of a U, inwardly, i.e. towards the slit. The legs are bent out of the plane in which the loop extends in a direction opposite to that in which the bent-away hook parts at the free ends of the legs face away from the slit.

Moreover, one of the two legs extending from the slit to the contact zone of the loop constituting the base of the isosceles triangle can be bent upwardly relative to the plane extending through the slit and the said triangle base, whereas the other legs can be bent downwardly relative to that same plane; the bent-away hook parts lie approximately in the same plane as the legs of the loop and tend to hold the slit narrow or almost closed so that the fastened plant part can not unintentionally slide through the slit and out of the loop.

Preferably, the legs extending from the two ends of the base zone of the loop to the slit form with the said base zone acute angles, preferably each of less than 30°.

The shoot can be most easily introduced into the preferred embodiment of the fastening clip according to the invention when held inclined at a small angle relative to the training wire.

BRIEF DESCRIPTION OF THE DRAWING

Details of the invention will now be described by reference to a preferred embodiment which is illustrated in the annexed drawings, wherein.

DETAILED DESCRIPTION OF THE EMBODIMENTS

Figure 1:
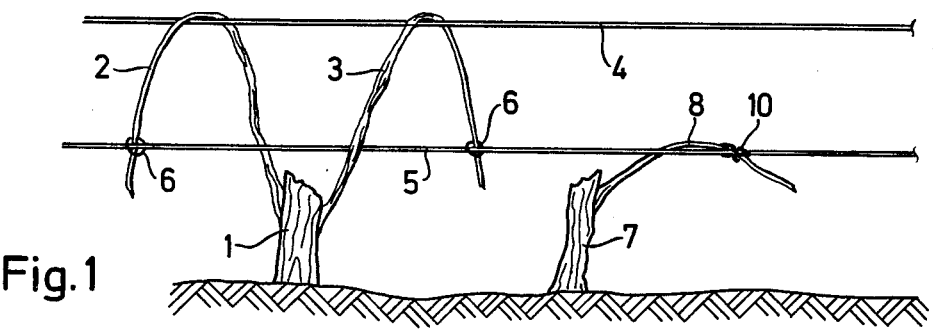
FIG. 1 shows schematically the training of the shoots of two trees, on the left hand by way of a known fastening clip and on the right hand by way of a fastening clip according to the invention.

In FIG. 1, the rootstock 1 carries two shoots 2 and 3 which are both bent over an upper training wire 4 and cross the lower or main training wire 5 approximately at a right angle. They are attached to the training wire 5 by fastening clips 6 of the type described in U.S. Pat. No. 3,800,365. A second rootstock 7 shown on the right hand side in FIG. 1 carries a shoot 8 which is fastened solely to the main training wire 5, which it crosses at an angle of about 30°, by means of a fastening clip 10 according to the invention.

Figure 2:
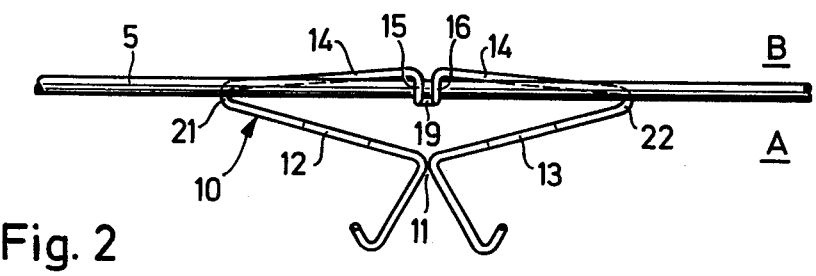
FIG. 2 shows in top view a fastening clip according to the invention fastened to a training wire.

Before the introduction of the shoot 8, the fastening clip 10 according to the invention is in the closed position shown in FIG. 2. In that position the open passage or slit 11 of the fastening clip 10, through which slit a shoot can be introduced, lies, together with the crimped legs 12 and 13 which delimit it, in that plane of projection extending through the training wire 5 in which the fastening clip 10 regarded in top view, encloses the largest area and on one side of the training wire 5 which side is designated by A, while the base zone 14 of the fastening clip 10 which is opposite the slit lies on the opposite side of the training wire which side is designated by B.

Figure 5:
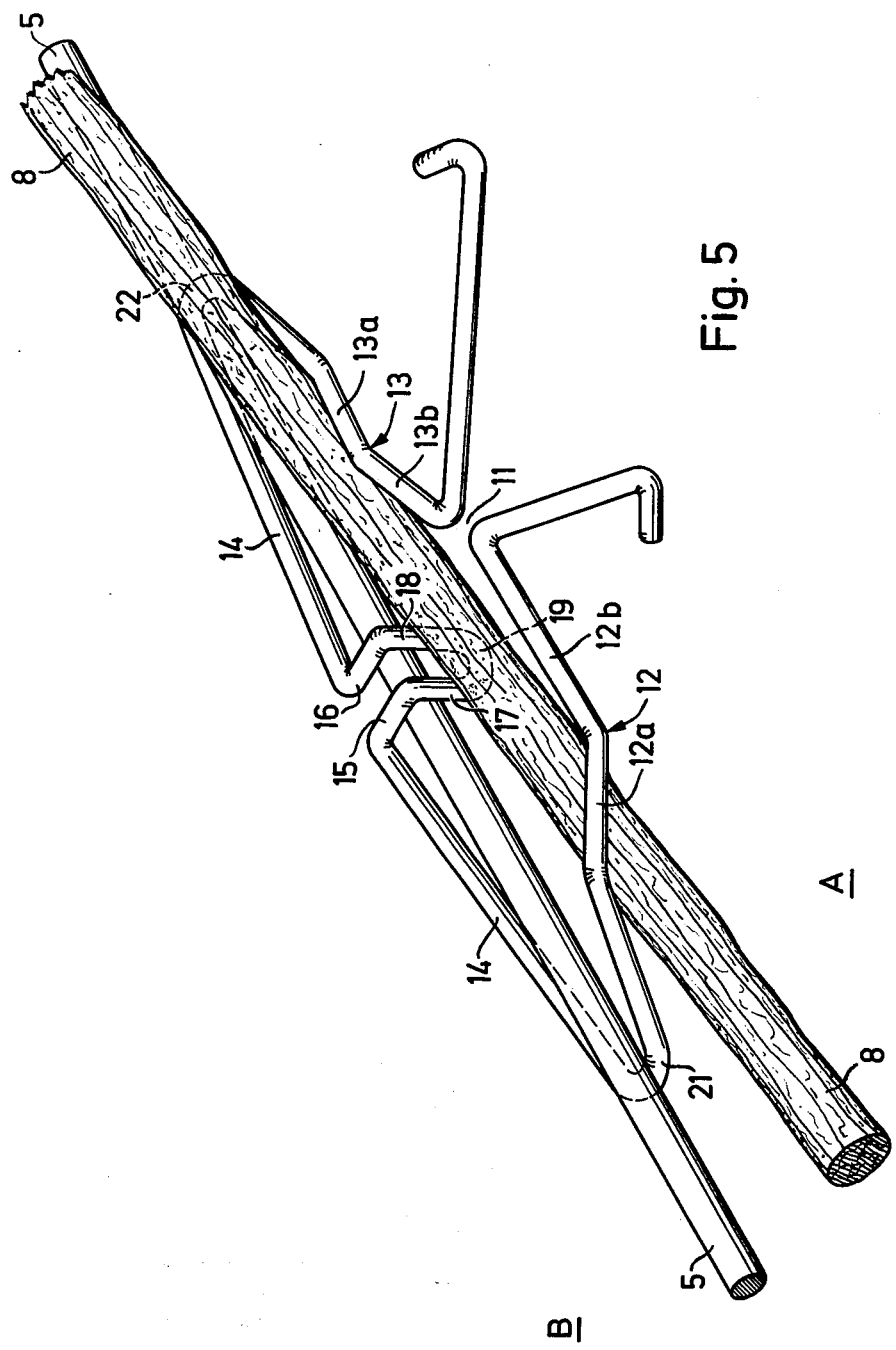
FIG. 5 shows a perspective view of the same clip viewed from a different direction with a shoot introduced therein.

The base zone 14 contains a gripper nose in its central region opposite the slit 11 which nose is formed, in the preferred embodiment, by two short nose parts 15 and 16, extending parallel to the above-mentioned plane of projection, and being bent at right angles relative to the base zone and toward the slit 11 and resting on the training wire 5 and being continued as hook parts 17 and 18 extending, on side A of the wire, downwardly on the side of their contact with the training wire 5 around the latter, which hook parts 17 and 18 are connected with one another by a transverse nose or end part 19. The crimped shanks 12 and 13 are connected with the base zone 14 of the fastening clip 10 via bent corner parts 21 and 22. This preferred form of the gripping nose in base zone 14 is shown best in the perspective view of FIG. 5.

The fastening clip 10 is fastened to the training wire 5 in such a way that the training wire rests on the bent parts 21 and 22 and contacts those sides of the nose parts 15 and 16 and of hook parts 17 and 18, respectively, which are situated on the inside of the hook thus formed by these parts and is thereby pressed against the base zone 14 of the fastening clip 10. The base zone 14 thereby extends in a plane which is perpendicular to the nose parts 15 and 16 and extends practically parallel to a plane which is also perpendicular to parts 15 and 16 and extends through the training wire 5.

Figure 3:
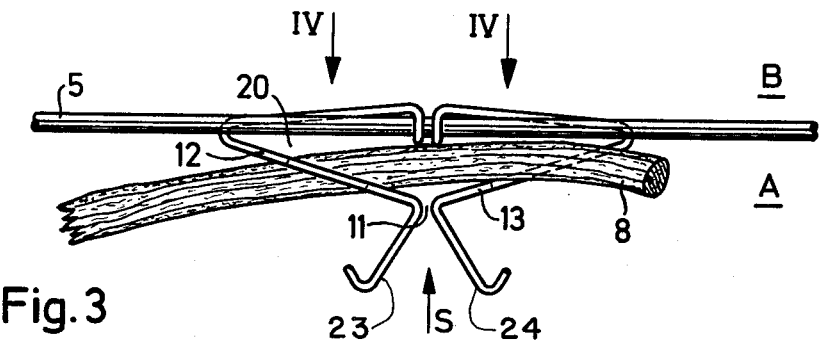
FIG. 3 shows the same clip as FIG. 2, but with an introduced shoot.

The introduction of a shoot 8 takes place through the slit 11 in the direction of an arrow S shown in FIG. 3, into the interior 20 of the fastening clip 10. The crimped shanks 12 and 13 having bent-away hook parts 23 and 24 then press the shoot 8 against the training wire 5 whereby the middle zone of the shoot 8 can be pressed against the parts 16, 17, 18 and 19 of the gripping nose.

Figure 4:
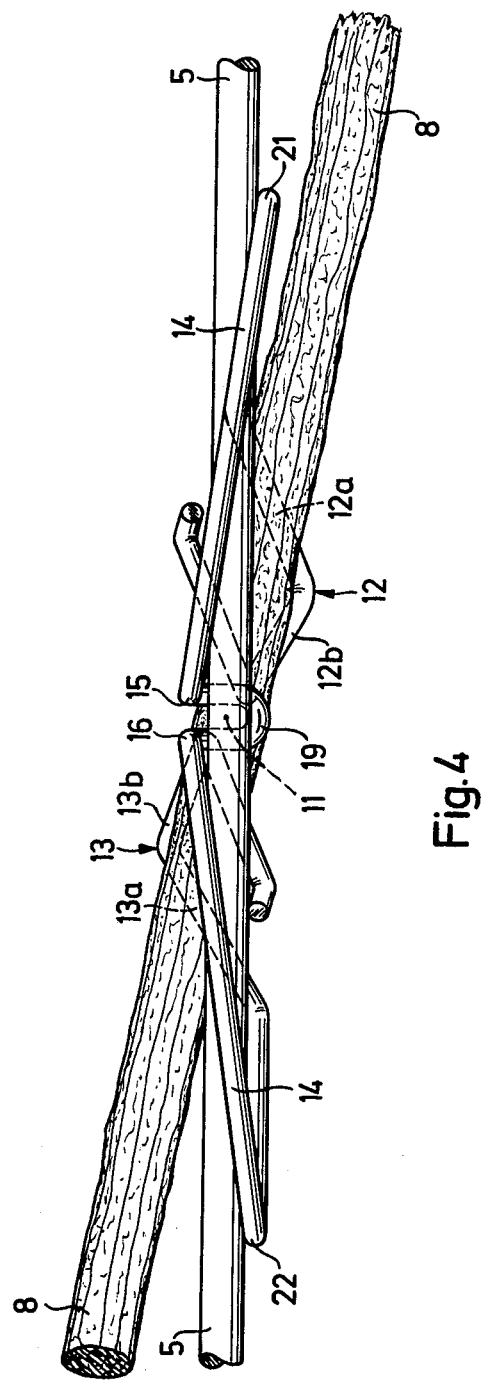
FIG. 4 shows in an enlarged view the same clip, with a shoot introduced therein as in FIG. 3, but viewed in the direction of the arrows IV in FIG. 2.

FIG. 4 shows an especially preferred embodiment of the fastening clip with crimped shanks 12 and 13 which are bent out of the plane of FIG. 3. Looking at the clip from the ends of bent parts 21 and 22, shanks 12 and 13 are at first bent in the same direction as the corresponding parts of zone 14 away from the nose parts 15 and 16 forming a part of the gripping nose, but are then bent back into the plane of FIG. 3 with shank parts 12b and 13b in the direction toward the nose end part 19 to form a slit 11.

Contrary to known fastening clips for fastening shoots or the like to horizontally stretched training wires as described, e.g. in German Gebrauchsmuster No. 1,997,133, German Offenlegungsschrift No. 1,582,881 or German Auslegeschrift 1,165,335, the fastening clip according to the invention, when fastened to a training wire, permits an easy displacement along the training wire, as long as no sapling or branch is introduced into it, and remains fast in its position on the training wire whereever once the plant part has been introduced into the clip. The introduced sapling is therefore in no danger of scraping in the training wire due to to-and-fro-movement of the fastening clip on the tensioning wire. Such a to-and-fro-movement of the sapling or the branch on the training wire would lead to damage of the plant, especially in spring when the sapling is green and the twig has a delicate bark or carries buds.

Training wires used for viniculture normally have a diameter of from 2 to 3 mm and preferably from 2.2 to 2.4 mm. Fastening clips according to the invention made of spring steel wire of a diameter of from 1.2 to 1.5 mm are preferably used with such training wires. When the training wires are thicker, fastening clips of correspondingly thicker wire are recommended, when they are thinner, clips of thinner wire are adequate.

We claim:

1. An elastically resilient fastening clip, in particular for the fastening of a trained plant including fruit trees, vines, or the like to a horizontally extending training wire, said clip comprising a slit loop (10) having a slit (11) which is widenable outwardly for introduction of a sapling, a twig, a shoot or the like part (8) of said plant and, after passing the plant part (8) therethrough, closes again under the clamping effect of said loop (10) of said fastening clip exercised at both sides of said slit (11); and said clip further comprising hook parts (23,24) bent at angles away from said slit (11) in said loop (10); said loop (10) having an elongated compressed or flattened shape in the plane in which the loop extends, and further comprising:

(a) a contact zone (14) extending opposite said slit (11) and approximately parallel to said training wire (5), (b) two crimped intermediate leg zones (12,13) between the ends of said contact zone (14) and said slit (11), and (c) a hook-shaped projection (17,18,19) having a nose part (19) bent out of the plane of the loop in the middle of said contact zone (14), said nose part (19) lying opposite said slit (11), being adapted for being hooked on to said training wire (5) by contacting the latter from that side (A) of the wire on which the bent-away leg parts (12,13) are located;

whereby, when said clip is fastened to said training wire (5), said contact zone (14) of said loop (10) comes to lie along one side (B) of said training wire, and said slit (11), said adjacent leg parts (12,13) and nose part (19) are on the other side (A) thereof, and, when said plant part (8) is introduced into said loop (10), it is pressed resiliently against said training wire (5), while, at the same time, the clamping tension caused by the insertion of said plant part (8) pulls said contact zone (14) into frictional contact with said training wire (5) and thereby prevents a lateral displacement of said clip along said training wire (5).

2. A fastening clip as defined in claim 1, wherein said slit loop (10) has the shape of a flat isosceles triangle with rounded angles and the slit (11) is situated in the vertex of the triangle, the base of the triangle forming the aforesaid contact zone (14) and said wire-engaging nose part (19) is in the middle of said base.

3. A fastening clip as defined in claim 2, wherein the two angle portions between the ends of the base (14) and the leg parts (12,13) of the isosceles triangle are destined to lie against the training wire on a side thereof that is opposite the side on which the projection parts (15,16) connecting the nose part (19) with the base (14) reach across the training wire (5).

4. A fastening clip as defined in claim 2, wherein said nose part (19) consists of a short stretch of said loop (10) in the reach opposite the slit (11), in the form of a U, bent inwardly, towards the slit.

5. A fastening clip as defined in claim 2, wherein said leg parts (12,13) are bent out of the plane in which the loop (10) extends, in a direction opposite to that in which the bent-away hook parts (23,24) at the free ends of the legs extend away from the slit (11).

6. A fastening clip as defined in claim 5, wherein a central portion (13a) of one of the two leg parts (12,13) is bent upwardly relative to the plane extending through the slit (11) and the said triangle base (14), whereas a corresponding portion (12a) of the other leg part (12) is bent downwardly relative to that same plane.

7. A fastening clip as defined in claim 3, wherein said leg parts (12,13) extending from the two ends of the base zone (14) of the loop (10) to the slit form with the said base zone acute angles, each of less than 30°.

* * * * *